(12) United States Patent
Shiraki et al.

(10) Patent No.: US 10,054,492 B2
(45) Date of Patent: Aug. 21, 2018

(54) THERMISTOR INCLUDING A THERMISTOR ELEMENT AND A CASE HOUSING THE THERMISTOR

(71) Applicants: TDK CORPORATION, Tokyo (JP); TOYOTA JIDOSHA KABUSHIKI KAISHA, Toyota-shi, Aichi (JP)

(72) Inventors: Satoru Shiraki, Tokyo (JP); Keiichi Kaneshige, Seto (JP); Masashi Matsumoto, Nagoya (JP); Masayuki Ikemoto, Anjyo (JP); Tsutomu Hatakeyama, Toyota (JP)

(73) Assignees: TDK CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 14/942,136

(22) Filed: Nov. 16, 2015

(65) Prior Publication Data
US 2016/0178445 A1   Jun. 23, 2016

(30) Foreign Application Priority Data
Dec. 19, 2014  (JP) .................................. 2014-257056

(51) Int. Cl.
*G01K 1/00* (2006.01)
*G01K 1/08* (2006.01)
*G01K 7/22* (2006.01)

(52) U.S. Cl.
CPC  *G01K 1/08* (2013.01); *G01K 7/22* (2013.01)

(58) Field of Classification Search
CPC combination set(s) only.
See application file for complete search history.

(56) References Cited

U.S. PATENT DOCUMENTS

| 5,910,189 A * | 6/1999 | Suzuki | G01F 23/248 338/226 |
| 6,466,123 B1 | 10/2002 | Kuzuoka et al. | |
| 7,012,502 B2 * | 3/2006 | Shibayama | G01K 7/22 338/229 |

(Continued)

FOREIGN PATENT DOCUMENTS

| CN | 1809733 A | 7/2006 |
| JP | H11-218449 A | 8/1999 |
| JP | 2005-024344 A | 1/2005 |

(Continued)

*Primary Examiner* — Lisa Caputo
*Assistant Examiner* — Nasir U Ahmed
(74) *Attorney, Agent, or Firm* — Oliff PLC

(57) ABSTRACT

A thermistor includes a case having a bottom section at one end and an opening section at the other end, a thermistor element housed in the case, a conducting wire housed in the case and connected to the thermistor element, and a lead wire connected to the conducting wire. The lead wire has a first portion including an insulating coating, and a second portion connected to the conducting wire and exposed from the insulating coating. A resin is filled up to a position away from an end edge of the opening section toward the bottom section so as to enclose at least the thermistor element, the conducting wire, and the second portion. The first portion is guided out of the resin to the outside of the case. An inner peripheral surface of the opening section is curved so as to increase an opening area of the opening section.

3 Claims, 4 Drawing Sheets

(56) References Cited

U.S. PATENT DOCUMENTS

2002/0089065 A1* 7/2002 Fujimoto ................ H01C 7/04
　　　　　　　　　　　　　　　　　　　257/777
2007/0110124 A1* 5/2007 Shiraki ................... G01K 1/08
　　　　　　　　　　　　　　　　　　　374/208

FOREIGN PATENT DOCUMENTS

| JP | 2008-286727 A | 11/2008 |
| JP | 2010-151805 A | 7/2010 |
| JP | 2010-190788 A | 9/2010 |
| JP | 2012-059731 A | 3/2012 |
| JP | 2013-149807 A | 8/2013 |

* cited by examiner

US 10,054,492 B2

THERMISTOR INCLUDING A THERMISTOR ELEMENT AND A CASE HOUSING THE THERMISTOR

TECHNICAL FIELD

The present invention relates to a thermistor.

BACKGROUND

Known thermistors include a thermistor element, copper wires connected to the thermistor element, lead wires connected to the copper wires, and a protecting case (e.g., cf. Japanese Patent Application Laid-open Publication No. 2012-59731). In such a thermistor, the thermistor element, copper wires, and ends of the lead wires are housed in the protecting case. The interior of the protecting case is filled with a hardening resin. The lead wires include electric wires and insulating coatings for protecting the electric wires, and are guided out of an opening section of the protecting case to the outside of the protecting case. In general, the lead wires are bent into a predetermined direction, depending upon an object to which the thermistor is attached.

SUMMARY

In a case where the resin is filled up to the end edge of the opening section of the protecting case, stress is concentrated on the bent portions of the lead wires if the lead wires are bent along the surface of the resin. In this case, the insulating coatings may be damaged at the bent portions, so as to result in disconnection of the lead wires. In a case where the resin is not filled up to the end edge, the bent lead wires may come into contact with the end edge of the opening section. In the case where the lead wires are in contact with the end edge of the opening section, the insulating coatings may be damaged, so as to result in disconnection of the lead wires.

An object of one aspect of the present invention is to provide a thermistor capable of suppressing damage to the insulting coatings of the lead wires to prevent the disconnection of the lead wires.

A thermistor according to one aspect of the present invention includes a case having a bottom section at one end and an opening section at the other end, a thermistor element housed in the case, a conducting wire housed in the case and connected to the thermistor element, and a lead wire connected to the conducting wire. The lead wire has a first portion including an insulating coating, and a second portion connected to the conducting wire and exposed from the insulating coating. A resin is filled up to a position away from an end edge of the opening section toward the bottom section, so as to enclose at least the thermistor element, the conducting wire, and the second portion. The first portion is guided out of the resin to the outside of the case. An inner peripheral surface of the opening section is curved so as to increase an opening area of the opening section.

In the thermistor according to the one aspect, the resin is filled up to the position away from the end edge of the opening section toward the bottom section. Namely, the resin does not reach the end edge of the opening section. For this reason, when the lead wire is bent, the lead wire is gently bent toward the end edge of the opening section, so as not to extend along the surface of the resin. As a result, the insulating coating is prevented from being damaged. Since the inner peripheral surface of the opening section is curved so as to increase the opening area of the opening section, a curved surface is formed inside the end edge of the opening section. When the lead wire is brought into contact with the opening section, the lead wire comes into contact with the curved surface. In this case, the contact between the lead wire and the opening section is surface contact, and thus force acting on the first portion of the lead wire from the case is dispersed. As a result, even if the lead wire comes into contact with the opening section, the insulating coating is prevented from being damaged. For the above-described reasons, disconnection of the lead wire is prevented in the thermistor according to the one aspect.

The opening section may have an indentation indented toward the bottom section so as to make the inside and outside of the case communicate. In this case, it is easy to check whether the resin is filled up to a desired position and whether the thermistor element, conducting wire, and second portion are insulated by the resin. It also allows a condition of an end face (surface) of the resin to be readily checked.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

An embodiment of the present invention will be described below in detail with reference to the accompanying drawings. It is noted that in the description the same elements or elements with the same functionality will be denoted by the same reference signs, without redundant description.

Figure 1:
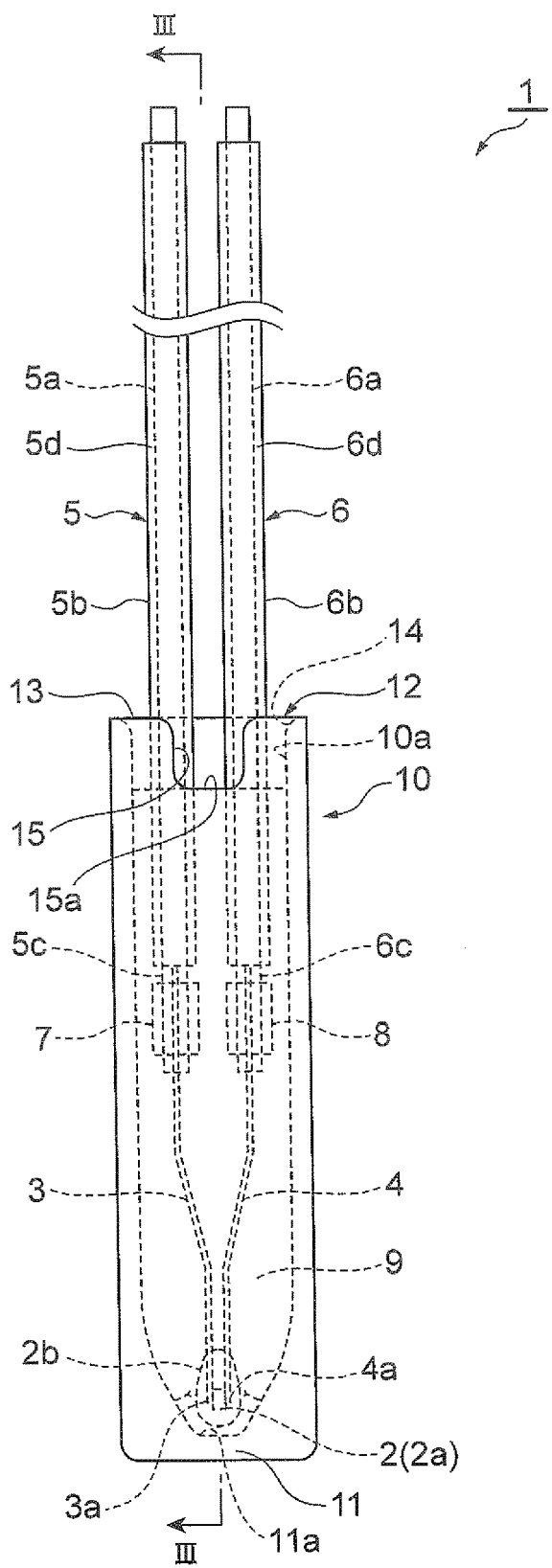
FIG. 1 is a front view of a thermistor according to one embodiment.
Figure 2:
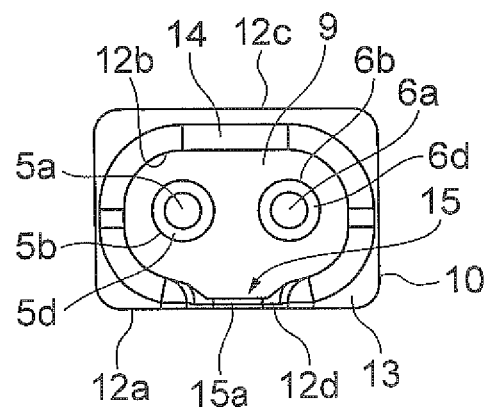
FIG. 2 is a plan view of the thermistor according to the embodiment.
Figure 3:
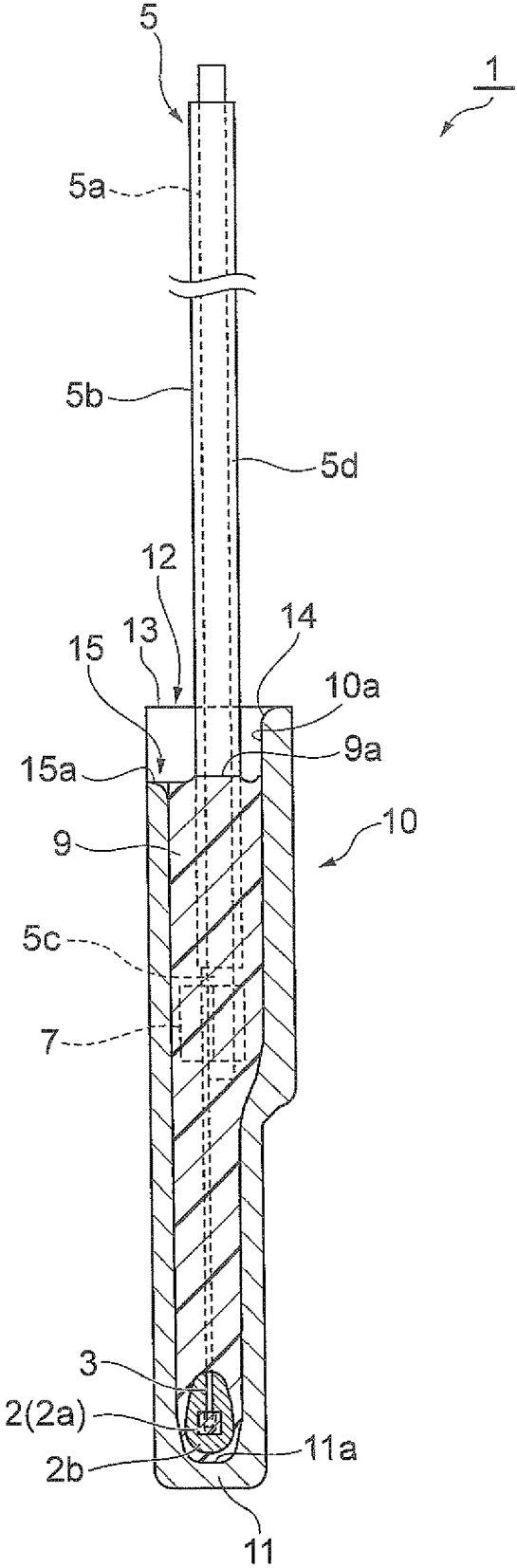
FIG. 3 is a drawing showing a cross-sectional structure along the line III-III in FIG. 1.

The configuration of the thermistor 1 according to the embodiment of the invention will be described with reference to FIGS. 1 to 3. FIG. 1 is a front view of the thermistor of the present embodiment. FIG. 2 is a plan view of the thermistor of the present embodiment. FIG. 3 is a drawing showing a cross-sectional structure along the line in FIG. 1.

As shown in FIGS. 1 to 3, the thermistor 1 includes a case 10, a thermistor element 2, a pair of conducting wires 3, 4, and a pair of lead wires 5, 6. The thermistor element 2 is housed in the case 10. The pair of conducting wires 3, 4 are housed in the case 10 and connected to the thermistor element 2. Each lead wire 5 or 6 is connected to the corresponding conducting wire 3 or 4, respectively.

As shown in FIG. 1, the case 10 has a bottom section 11 at one end in a longitudinal direction of the case 10 and an opening section 12 at the other end in the longitudinal direction. The case 10 has the bottom section 11 and a body section including the opening section 12. The case 10 has a bottomed tubular shape. An outer periphery 12a and an inner periphery 12b of the opening section 12 are shaped in a corner-rounded rectangular shape on the plan view, as shown in FIG. 2. As shown in FIG. 3, an inner peripheral surface 10a of the case 10 is curved so as to increase an opening area of the opening section 12. In this configuration, a curved surface 14 is formed inside an end edge 13 of the opening section 12. The curved surface 14 reaches the end edge 13. The case 10 is made, for example, of a synthetic resin such as PPS (polyphenylenesulfide) resin.

As shown in FIG. 1, the opening section 12 has an indentation 15 indented from the end edge 13 toward the bottom section 11 so as to make the inside and outside of the case 10 communicate. The indentation 15 is indented in an approximate U-shape. The opening section 12 of the corner-rounded rectangular shape has a pair of long sides 12c, 12d. In the present embodiment, the lead wires 5, 6 are assumed to be bent toward one long side 12c (cf. FIG. 4). For this reason, as shown in FIG. 2, the indentation 15 is located in an approximate center of the other long side 12d.

The thermistor element 2 is, for example, an NTC (Negative Temperature Coefficient) thermistor element. The NTC thermistor element has a property of decreasing resistance with increasing temperature. The thermistor element 2 includes a thermistor element body 2a, and, first and second electrodes (not shown) disposed with the thermistor element body 2a in between.

The thermistor element body 2a is a sintered body of a metal oxide. The thermistor element body 2a has an approximately rectangular parallelepiped shape. The metal oxide contains Mn as a major component and also contains at least one of Ni, Co, Ca, Zr, Al, Cu, and Fe as a minor component. The first electrode and the second electrode are disposed on two opposed end faces of the thermistor element body 2a and are electrically connected to the thermistor element body 2a. The first and second electrodes are made of a metal (e.g., Au, Ag, Pd, or an Ag—Pd alloy, or the like). The thermistor element 2 is disposed at a predetermined position near the bottom section 11 in the case 10.

The pair of conducting wires 3, 4 are comprised, for example, of Dumet wires. As shown in FIG. 1, one end 3a of the conducting wire 3 is connected to the first electrode of the thermistor element body 2a. The one end 3a and the first electrode are electrically connected. One end 4a of the conducting wire 4 is connected to the second electrode of the thermistor element body 2a. The one end 4a and the second electrode are electrically connected. The connection between the conducting wire 3 and the first electrode and the connection between the conducting wire 4 and the second electrode are implemented, for example, by soldering. The connection between the conducting wire 3 and the first electrode and the connection between the conducting wire 4 and the second electrode may be implemented by a technique except for the soldering. The thermistor element 2 to which the conducting wires 3, 4 are connected is sealed with glass 2b. The thermistor element 2 is housed in the case 10 while being sealed with glass 2b.

The lead wire 5 has a first portion 5b and a second portion 5c. The first portion 5b includes a conductive part 5a consisting of a core wire, and an insulating coating 5d covering the conductive part 5a. Namely, the first portion 5b is a coated portion where the conductive part 5a is covered by the insulating coating 5d. The second portion 5c includes the conductive part 5a but does not include the insulating coating 5d. Namely, the conductive part 5a is exposed from the insulating coating 5d, in the second portion 5c. The second portion 5c is an exposed portion where the conductive part 5a is exposed from the insulating coating 5d. The second portion 5c is located at one end of the lead wire 5. The second portion 5c is connected to the conducting wire 3 by a connection portion 7. The lead wire 5 and the conducting wire 3 are electrically connected. The lead wire 6 has a first portion 6b and a second portion 6c. The first portion 6b includes a conductive part 6a consisting of a core wire, and an insulating coating 6d covering the conductive part 6a. Namely, the first portion 6b is a coated portion where the conductive part 6a is covered by the insulating coating 6d. The second portion 6c includes the conductive part 6a but does not include the insulating coating 6d. Namely, the conductive part 6a is exposed from the insulating coating 6d, in the second portion 6c. The second portion 6c is an exposed portion where the conductive part 6a is exposed from the insulating coating 6d. The second portion 6c is located at one end of the lead wire 6. The second portion 6c is connected to the conducting wire 4 by a connection portion 8. The lead wire 6 and the conducting wire 4 are electrically connected. Each of the connection portions 7, 8 is configured of a metal fastener of a tubular shape or the like. In the present embodiment, the length of each connection portion 7, 8 is shorter than the longitudinal length of the corresponding second portion 5c, 6c. Each connection portion 7, 8 is located in an approximate center in the longitudinal direction of the corresponding second portion 5c, 6c. For this reason, there is no overlap between the connection portions 7, 8 and the first portions 5b, 6b and a part of the second portion 5c, 6c is exposed from between the connection portion 7, 8 and the first portion 5b, 6b. Since the second portions 5c, 6c are housed in the case 10, the ends on the second portion 5c, 6c side of the first portions 5b, 6b are also housed in the case 10.

For preventing short circuit, the conducting wire 3, connection portion 7, and second portion 5c are disposed with a space in the case from the conducting wire 4, connection portion 8, and second portion 6c so as to avoid contact between them. For example, an electrically insulating spacer may be disposed between the conducting wire 3, connection portion 7, and second portion 5c and the conducting wire 4, connection portion 8, and second portion 6c.

The interior of the case 10 is filled with a resin 9. The resin 9 has an electrically insulating property and is, for example, a thermosetting resin. The thermosetting resin to be used herein is an epoxy resin or the like. The resin 9 is hardened with the resin 9 filled in the case 10. The resin 9 is filled from a bottom surface 11a of the case 10 up to a position where the resin reaches the first portions 5b, 6b over the second portions 5c, 6c of the lead wires 5, 6. This ensures electrical insulation of the thermistor element 2, conducting wires 3, 4, connection portions 7, 8, and second portions 5c, 6c. The resin is filled up to a position at a predetermined distance away from the end edge 13 of the opening section 12 toward the bottom section 11. In the present embodiment, the resin 9 is filled up to the vicinity of an end 15a on the bottom section 11 side of the indentation 15. It results in certainly hermetically enclosing the thermistor element 2, conducting wires 3, 4, connection portions 7, 8, and second portions 5c, 6c, while also covering parts of the first portions 5b, 6b with the resin 9. Parts of the first portions 5b, 6b exposed from the resin 9 are guided out of a surface 9a of the resin 9 and through the opening section 12 of the case 10 to the outside of the case 10.

As shown in FIG. 3, the surface 9a of the resin 9 rises around the lead wires 5, 6 and around the inner peripheral surface 10a of the case 10 because of surface tension of the resin 9 on the occasion of being charged into the case 10. Heights of the rise of the surface 9a can vary within a certain range.

Figure 4:
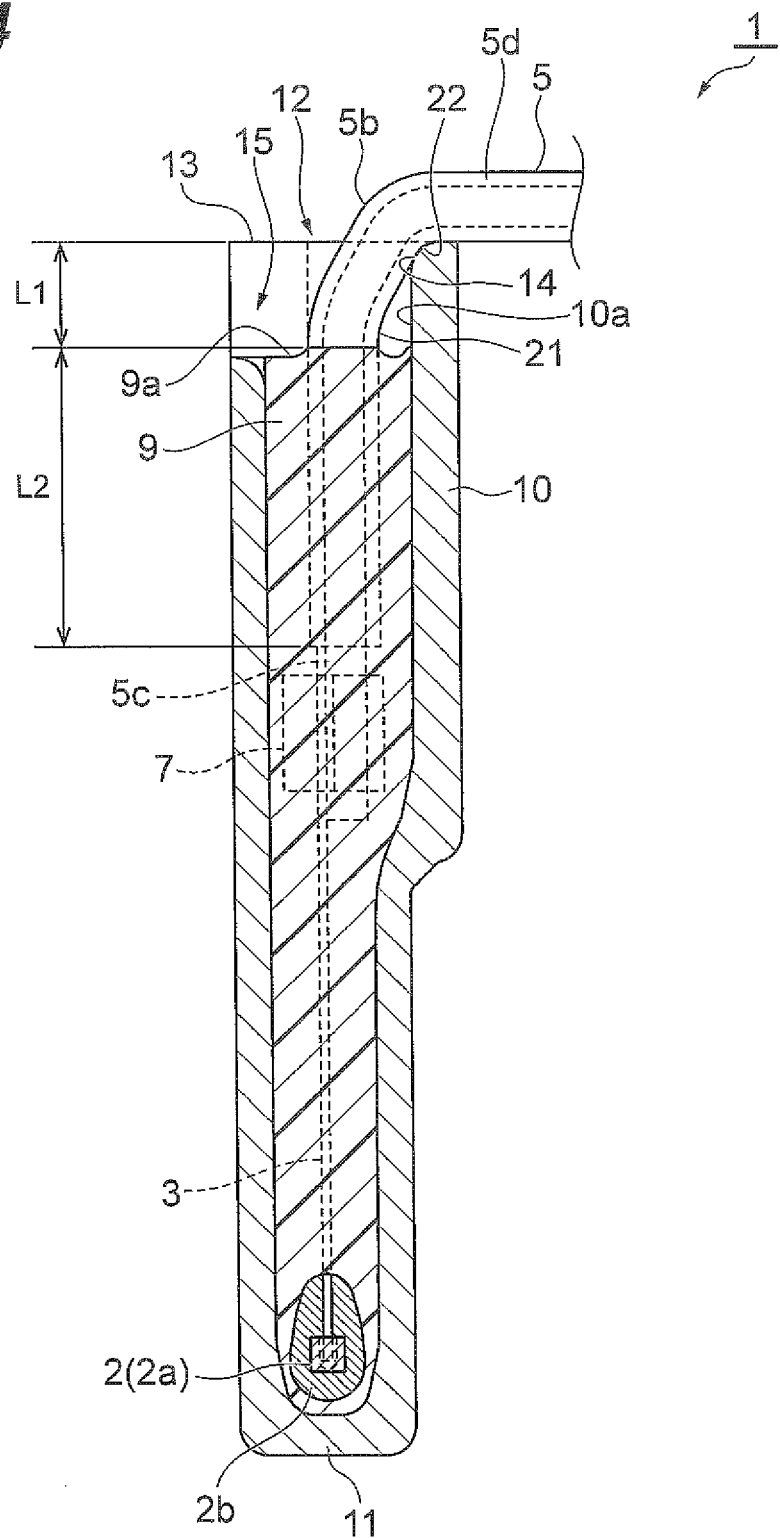
FIG. 4 is a drawing showing a state in which lead wires are bent, in the thermistor according to the embodiment.

The following will describe effects by the thermistor 1 of the present embodiment, with reference to FIG. 4. FIG. 4 is a drawing showing a state in which the lead wires are bent, in the thermistor of the present embodiment. In FIG. 4, the lead wires 5, 6 are bent toward the long side 12c of the opening section 12 by a predetermined tension. FIG. 4 is the drawing showing the cross-sectional configuration of the thermistor 1, and thus FIG. 4 is depicted without illustration of the conducting wire 4, lead wire 6, and connection portion 8.

The lead wires 5, 6 are bent toward the end edge 13 of the opening section 12 in the vicinity of the surface 9a of the resin 9. It results in forming bent portions 21 in the lead wires 5, 6. The lead wires 5, 6 are bent into a direction perpendicular to the longitudinal direction of the case 10, while being kept in contact with the opening section 12. It results in forming bent portions 22 in the lead wires 5, 6. The resin 9 is not filled up to the end edge 13 of the opening section 12. Specifically, the surface 9a of the resin 9 and the end edge 13 of the opening section 12 are separated by a predetermined distance L1. For this reason, the lead wires 5, 6 are bent at a gentle angle larger than 90° in the bent portions 21 and the bent portions 22. In the bent portions 22 the lead wires 5, 6 are in contact with the curved surface 14 formed at the end edge 13 of the opening section 12.

In the thermistor 1 of the present embodiment, as described above, the resin 9 is filled up to the position away from the end edge 13 of the opening section 12 toward the bottom section 11. Namely, the resin 9 do not reach the end edge 13 of the opening section 12. For this reason, when the lead wires 5, 6 are bent, the lead wires 5, 6 are gently bent toward the end edge 13 of the opening section 12, so as not to extend along the surface 9a of the resin 9. Since the lead wires 5, 6 are bent stepwise at two locations, stress generated in the first portions 5b, 6b (bent portions 21 and bent portions 22) is smaller than in the case where the lead wires 5, 6 are bent at one location. As a result, the insulating coatings 5d, 6d of the first portions 5b, 6b are prevented from being damaged. Since the curved surface 14 is formed inside the end edge 13 of the opening section 12, when the lead wires 5, 6 are brought into contact with the opening section 12, the lead wires 5, 6 (first portions 5b, 6b) come into contact with the curved surface 14. In this case, since the contact between the lead wires 5, 6 and the curved surface 14 is surface contact, force acting on the first portions 5b, 6b of the lead wires 5, 6 from the case 12 is dispersed. As a result, even in the case where the lead wires 5, 6 are brought into contact with the opening section 12, the insulating coatings 5d, 6d of the first portions 5b, 6b are prevented from being damaged. Therefore, disconnection of the lead wires 5, 6 is prevented in the thermistor 1.

Since the resin 9 is filled from the bottom surface 11a of the case 10 up to the position where it reaches the first portions 5b, 6b over the second portions 5c, 6c of the lead wires 5, 6, electrical insulation is ensured for the thermistor element 2, conducting wires 3, 4, connection portions 7, 8, and second portions 5c, 6c. In this case, the distance L2 from the second portions 5c, 6c to the surface 9a of the resin 9 is set to not less than a predetermined distance, thereby further securing the electrical insulation. As a result, reliability of the thermistor 1 can be enhanced.

The heights of the rise of the surface 9a of the resin 9 can vary. If the surface 9a of the resin 9 has an excess rise, the distance from the surface 9a of the resin 9 to the end edge 13 of the opening section 12 may be smaller than the predetermined distance L1. In this case, the angle of the bent portions 21 becomes smaller, which can increase the stress generated in the first portions 5b, 6b.

In the thermistor 1 of the present embodiment, the indentation 15 indented toward the bottom section 11 is formed in the end edge 13 of the opening section 12. In this case, it is easily checked by visual observation through the indentation 15, whether the resin is filled up to the predetermined position, i.e., whether the distance L2 is not less than the predetermined distance. It also allows whether the thermistor element 2, conducting wires 3, 4, connection portions 7, 8, and second portions 5c, 6c are insulated by the resin 9 to be readily checked. The rise of the surface 9a of the resin 9 can be readily checked by visual observation through the indentation 15. By this, the quality of the thermistor 1 can be kept constant.

The above described the embodiment of the present invention but it should be noted that the present invention is not always limited to the above-described embodiment and that the present invention can be modified in many ways without departing from the spirit and scope of the invention.

For example, the thermistor element 2 does not have to be limited to the NTC thermistor element. The thermistor element 2 only needs to be a thermosensor and may be another element, for example, such as a PTC (Positive Temperature Coefficient) thermistor element.

What is claimed is:

1. A thermistor comprising:
    a case having a bottom section at a one end and an opening section at an other end;
    a thermistor element housed in the case;
    a conducting wire housed in the case and connected to the thermistor element; and
    a lead wire connected to the conducting wire,
    wherein the lead wire has a first portion including an insulating coating, and a second portion connected to the conducting wire and exposed from the insulating coating,
    wherein a resin is filled up to a position away from an end edge of the opening section toward the bottom section so as to enclose at least the thermistor element, the conducting wire, and the second portion,
    wherein the first portion is guided out of the resin to the outside of the case,
    wherein an inner peripheral surface of the opening section is curved so as to increase an opening area of the opening section, and
    wherein the opening section has an indentation indented toward the bottom section so as to make the inside and outside of the case communicate, and a surface of the resin is viewable through the indentation.

2. The thermistor according to claim 1, wherein the lead wire is in contact with the inner peripheral surface of the opening section.

3. The thermistor according to claim 1, wherein the surface of the resin and the end edge of the opening section are separated by a predetermined distance.

* * * * *